United States Patent
Qu et al.

(10) Patent No.: US 10,613,257 B2
(45) Date of Patent: Apr. 7, 2020

(54) PIXEL UNIT, DISPLAY PANEL, AND DISPLAY DEVICE

(71) Applicants: BOE TECHNOLOGY GROUP CO., LTD., Beijing (CN); Beijing BOE Display Technology Co., Ltd., Beijing (CN)

(72) Inventors: Lianjie Qu, Beijing (CN); Bingqiang Gui, Beijing (CN); Yonglian Qi, Beijing (CN); Chengshao Yang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 50 days.

(21) Appl. No.: 15/923,232

(22) Filed: Mar. 16, 2018

(65) Prior Publication Data

US 2019/0086587 A1 Mar. 21, 2019

(30) Foreign Application Priority Data

Sep. 20, 2017 (CN) .......................... 2017 1 0855271

(51) Int. Cl.
- *G02B 5/02* (2006.01)
- *G02F 1/1335* (2006.01)
- *G02B 5/28* (2006.01)
- *G02B 1/11* (2015.01)
- *G02B 5/20* (2006.01)

(52) U.S. Cl.
CPC ........... *G02B 5/0242* (2013.01); *G02B 5/288* (2013.01); *G02F 1/133555* (2013.01); *G02B 1/11* (2013.01); *G02B 5/201* (2013.01)

(58) Field of Classification Search
CPC ..... G06F 1/1652; G02B 5/0242; G02B 5/288; G02B 5/201; G02F 1/133555; G02F 1/13718; G02F 2001/13478; G02F 1/13473; G02F 1/1347; G02F 2001/133618
See application file for complete search history.

(56) References Cited

U.S. PATENT DOCUMENTS

| 2002/0015314 A1 | 2/2002 | Umemoto et al. |
| 2002/0054424 A1 | 5/2002 | Miles |
| 2012/0099062 A1* | 4/2012 | Chen ................ G02F 1/133536 349/115 |

FOREIGN PATENT DOCUMENTS

| CN | 101019071 A | 8/2007 |
| CN | 101498800 A | 8/2009 |

(Continued)

OTHER PUBLICATIONS

First Office Action for Chinese Patent Application No. 201710855271.9 dated Jul. 15, 2019.

*Primary Examiner* — Ryan D Howard
(74) *Attorney, Agent, or Firm* — Calfee, Halter & Griswold LLP

(57) ABSTRACT

The present disclosure provides a pixel unit, a display panel, and a display device, which relates to the field of display technology. The pixel unit includes: a base substrate; a reflective layer, disposed on a side of the base substrate; a resonant layer, disposed on a side of the reflective layer away from the base substrate; a transflective layer, disposed on a side of the resonant layer away from the base substrate; and a scattering layer, disposed on a side of the transflective layer away from the base substrate.

16 Claims, 3 Drawing Sheets

(56) References Cited

FOREIGN PATENT DOCUMENTS

| CN | 101600901 | A | | 12/2009 |
|---|---|---|---|---|
| CN | 102998835 | A | | 3/2013 |
| CN | 103293759 | A | | 9/2013 |
| CN | 105892042 | A | * | 8/2016 |
| CN | 105892042 | A | | 8/2016 |

* cited by examiner

PIXEL UNIT, DISPLAY PANEL, AND DISPLAY DEVICE

CROSS REFERENCE

The present application is based upon and claims priority to Chinese Patent Application No. 201710855271.9, filed on Sep. 20, 2017, and the entire contents thereof are incorporated herein by reference to serve as a part of the present application.

TECHNICAL FIELD

The present disclosure relates to the field of display technology, and in particular, to a pixel unit, a display panel, and a display device.

BACKGROUND

Flat panel displays have become the most widely used display devices due to their advantages of lightness, low power consumption and the like. Depending on that the light source is an internal light source or an external light source, the flat panel display may be classified into a transmissive display and a reflective display. At present, outdoor dedicated displays or portable displays mostly use reflective display panels. Such display panels are provided with reflective layers which may be used to reflect the ambient light to be served as a display light source.

It should be noted that, information disclosed in the above background portion is provided only for better understanding of the background of the present disclosure, and thus it may contain information that does not form the prior art known by those ordinary skilled in the art.

SUMMARY

According to an aspect of the present disclosure, there is provided a pixel unit, including:
  a base substrate;
  a reflective layer, disposed on a side of the base substrate;
  a resonant layer, disposed on a side of the reflective layer away from the base substrate;
  a transflective layer, disposed on a side of the resonant layer away from the base substrate; and
  a scattering layer, disposed on a side of the transflective layer away from the base substrate.

In an exemplary embodiment of the present disclosure, the scattering layer includes a planarization layer and microparticles dispersed inside the planarization layer.

In an exemplary embodiment of the present disclosure, the microparticle includes an absorber that absorbs a light with a specific wavelength.

In an exemplary embodiment of the present disclosure, the absorber includes metal microparticles, and a size of the metal microparticle is in an order of nanometer.

In an exemplary embodiment of the present disclosure, the metal microparticle includes one or more of gold, silver and copper.

In an exemplary embodiment of the present disclosure, the microparticle includes a scatterer, and a refractive index of the scatterer is different from that of the planarization layer.

In an exemplary embodiment of the present disclosure, the scatterer includes organic particles.

In an exemplary embodiment of the present disclosure, the scatterer includes an air microcavity.

In an exemplary embodiment of the present disclosure, the pixel unit further includes: a transmission enhanced layer, disposed on a side of the scattering layer away from the base substrate.

In an exemplary embodiment of the present disclosure, the transmission enhanced layer has a micro-pillar structure, and upper and lower surfaces of the transmission enhanced layer have a symmetrical structure.

In an exemplary embodiment of the present disclosure, the transmission enhanced layer has a multilayer film structure.

In an exemplary embodiment of the present disclosure, the transmission enhanced layer includes a micro-pillar structure and a multilayer film structure symmetrically disposed on two sides of the micro-pillar structure.

According to an aspect of the present disclosure, there is provided a display panel, including the pixel unit described above.

According to an aspect of the present disclosure, there is provided a display device, including the display panel described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. Apparently, the accompanying drawings in the following description are merely some embodiments of the present disclosure, and those skilled in the art may further derive other drawings based on these accompanying drawings without creative labor.

DETAILED DESCRIPTION

Figure 1:
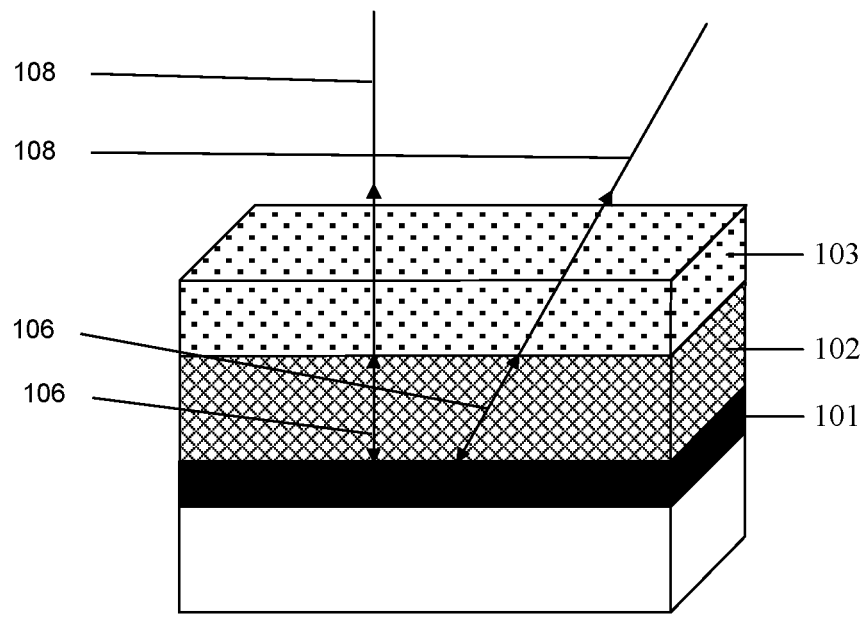
FIG. 1 schematically shows a schematic structural view of a reflective display according to a comparison embodiment.

Example embodiments will now be described more fully with reference to the accompanying drawings. However, the example embodiments may be embodied in many forms and should not be construed as limited to the examples set forth herein; rather, these embodiments are provided to make the present disclosure more thorough and complete, and to fully convey the concepts of the example embodiments to those skilled in the art. The features, structures, or characteristics described herein may be combined in one or more embodiments in any suitable manner. In the following description, numerous specific details are given to provide a thorough understanding of embodiments of the present disclosure. However, those skilled in the art will recognize that the technical solutions of the present disclosure may be practiced without one or more of the specific details, or may adopt other methods, components, devices, steps and the like. In other instances, well-known technical solutions may not be shown or described in detail to avoid obscuring aspects of the present disclosure.

In addition, the drawings are merely schematic representations of the present disclosure and are not necessarily drawn to scale. The thickness and shape of the each layer in the drawings do not reflect the true scale, but for facilitating illustrating the content of the present disclosure only. The same reference numerals in the drawings identify the same or similar parts, and repetitive description thereof will be omitted.

According to an example of the present disclosure, FIG. 1 shows a basic structure diagram of a reflective display. The reflective display may mainly include a reflective layer 101, a resonant layer 102, and a transflective layer 103 disposed on the base substrate 100. In the embodiment, a side of the transflective layer 103 is a light emitting side of the reflective display. Specifically, the reflective layer 101 may be generally made of a highly reflective material, such as silver Ag, aluminum Al, or other metal materials. The transflective layer 103 may be generally made of a transflective material, such as chromium (Cr) or the like. Currently, there are mainly two kinds of the resonant layer 102, wherein one kind is made of a low absorption material, and the other kind is made of an absorbing material with a specific wavelength. The light wave 106 reciprocates in the resonant cavity, and when a thickness of the resonant cavity is an integral multiple of the half wavelength of the light, the light with the corresponding wavelength will be enhanced and emitted. However, the reflective display as shown in FIG. 1 still has the following problem: i.e., when the user views in a side viewing angle, since the wavelength of the exit light 108 increases due to the increase of the resonant length, red shift of the light will occur to cause a cross color, which will result in color shift phenomenon when viewed in a side viewing angle.

Figure 2:
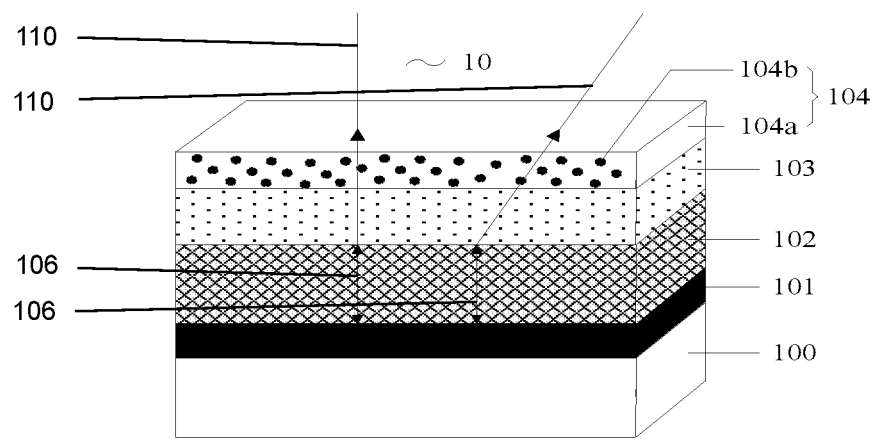
FIG. 2 schematically shows a schematic structural view of a reflective display according to an exemplary embodiment of the present disclosure.

The example embodiment provides a pixel unit which may be applicable to a reflective display. As shown in FIG. 2, the pixel unit 10 may include:

a base substrate 100;

a reflective layer 101, disposed on a side of the base substrate 100;

a resonant layer 102, disposed on a side of the reflective layer 101 away from the base substrate 100;

a transflective layer 103, disposed on a side of the resonant layer 102 away from the base substrate 100; and a scattering layer 104, disposed on a side of the transflective layer 103 away from the base substrate 100.

In the embodiment, the resonant layer 102 between the reflective layer 101 and the transflective layer 103 may constitute a resonant cavity of the light. When the thickness of the resonant cavity is an integral multiple of a half wavelength of a light, the light 110 of the corresponding wavelength may be emitted out.

It should be noted that in the reflective display provided in this example embodiment, a side of the base substrate 100 provided with the reflective layer 101 is a light exiting side of the display.

Through the pixel unit provided by the exemplary embodiment of the present disclosure, a scattering layer 104 is added on the basis of the conventional reflective display, in this way, the normal light emitted from the resonant cavity may be scattered or the abnormal light emitted from the resonant cavity may be absorbed, thereby improving the cross color problem when viewed in a side viewing angle, mitigating the color shift phenomenon, so that the display can get a better display effect.

Based on this structure, as shown in FIG. 2, the scattering layer 104 may include a planarization layer 104a and microparticles 104b dispersed inside the planarization layer 104a. The material of the planarization layer 104a may include a transparent material, and sizes of the microparticles 104b may be set in the order of nanometer. Besides, these microparticles 104b with extremely small sizes are evenly dispersed in the transparent planarization layer 104a, so as to scatter the light or absorb the light.

In one implementation of this example, the microparticle 104b may include an absorber that absorbs a light with a specific wavelength. In the embodiment, the absorber may include metal microparticles, such as one or more of gold, silver and copper.

In this way, in the present embodiment, by providing the scattering layer 104 including the metal microparticles, lights which are not R, G, and B are absorbed as desired, which may prevent the color shift problem when viewed in a side viewing angle, and at the same time, it may further improve the contrast ratio of the light.

In another implementation of this example, the microparticle 104b may further include a scatterer, and a refractive index of the scatterer is different from that of the planarization layer 104a. For example, the scatterer may include medium particles such as organic particles or air microcavities.

In this way, since the refractive index of the scatterer is different from that of the planarization layer 104a, the light incident on the surface of the organic particles or inside the air microcavity will be scattered, so that the light originally emitted perpendicularly to the surface of the resonant cavity will be further scattered to other directions. In this way, the red shift problem of the light caused by the increase of the resonance length when viewed in a side viewing angle may be solved in a certain degree, effectively improving the color shift phenomenon and at the same time playing a transmission enhanced effect.

Figure 3:
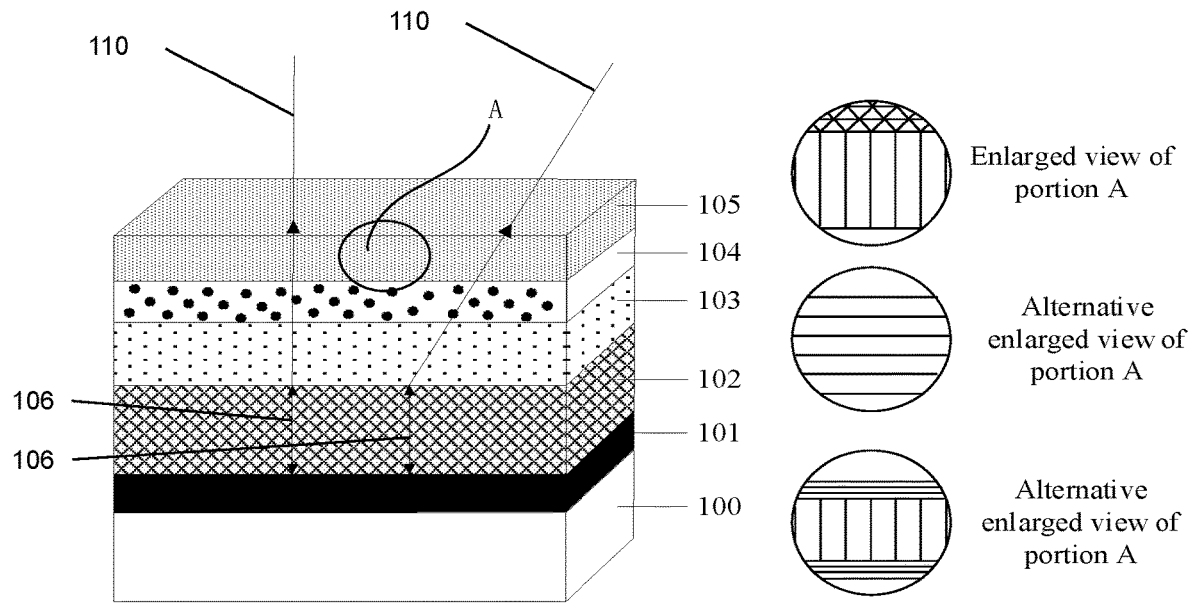
FIG. 3 schematically shows another structural schematic diagram of a reflective display according to an exemplary embodiment of the present disclosure.

Based on the pixel structure described above, referring to FIG. 3, the pixel unit may further include a transmission enhanced layer 105 disposed on a side of the scattering layer 104 away from the base substrate 100. The transmission enhanced layer 105 may be used to reduce the reflected light and increase the transmitted light 110, thereby increasing the contrast ratio of the display.

In one embodiment, the transmission enhanced layer 105 may be configured as a multilayer film structure. The transmission enhanced layer 105 of such a multilayer structure is easy to be manufactured and relatively easy to be implemented.

In another embodiment, the transmission enhanced layer 105 may have a micro-pillar structure, and micro-pillar structures of upper and lower surfaces are symmetrical. Such a symmetrical structure can cause the upper and lower surfaces to obtain the uniform transmission enhanced effect.

In still another embodiment, the transmission enhanced layer 105 may further include a micro-pillar structure and a multilayer film structure symmetrically disposed on two sides of the micro-pillar structure. In this way, the transmission enhanced layer 105 is provided by adding the longitudinally symmetrical multilayer film structure on the basis of the micro-pillar structure, which may also achieve the consistency of the transmission enhanced effects of the upper and lower surfaces.

In this example embodiment, the base substrate 100 may be a transparent substrate such as a glass substrate, or may also be an opaque substrate such as a metal substrate. Since the pixel unit is applied to the reflective display and the side of the base substrate 100 provided with the reflective layer 101 is the light emitting side, it is possible to ignore the influence of the translucency of the base substrate 100 on the reflective display.

In addition, the base substrate 100 may be a rigid substrate, such as a glass substrate, to form a rigid display device. Alternatively, the base substrate 100 may also be a flexible substrate, such as polyimide (PI), to form a flexible display device.

Optionally, the reflective layer 101 may be made of a metal material having high reflective properties, such as silver Ag, aluminum Al, or the like.

Optionally, the transflective layer 103 may be prepared by using a transflective material, such as chromium Cr or the like.

Based on the above description, the pixel unit provided in the present exemplary embodiment may include the reflective layer 101, the resonant layer 102, the transflective layer 103, the scattering layer 104, and the transmission enhanced layer 105 disposed on the base substrate 100. Based on the reflective display formed by the pixel unit of the structure, on one hand, the cross color problem when viewed in a side viewing angle may be effectively improved, thus mitigating the color shift phenomenon when viewed in a side viewing angle, on the other hand, the reflection of the light from the light emitting surface may be further reduced, thus increasing the contrast radio of the display.

Figure 4:
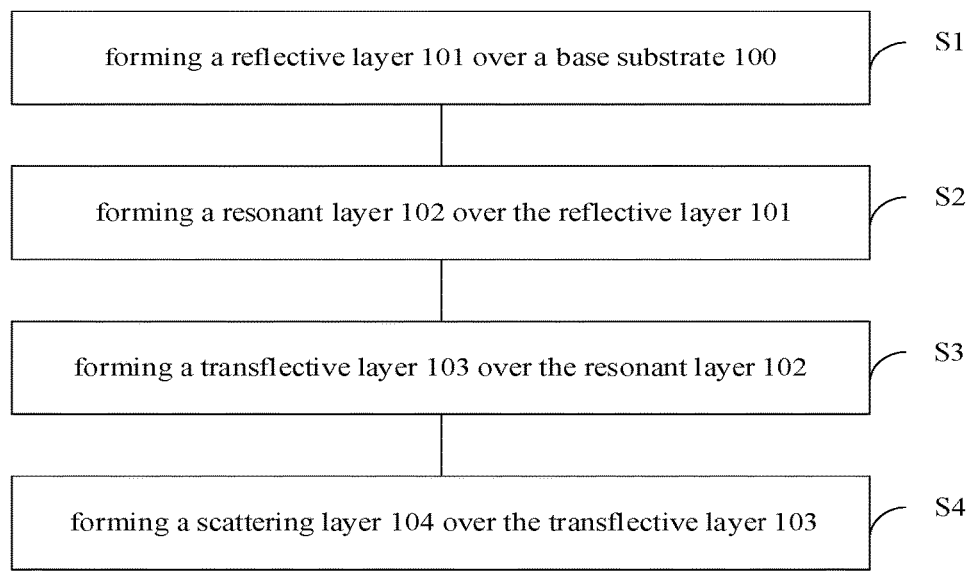
FIG. 4 schematically shows a preparation flow chart of a reflective display according to an exemplary embodiment of the present disclosure.

Correspondingly, the present example embodiment further provides a method for preparing a pixel unit. As shown in FIG. 4, the preparing method may include:

S1: forming a reflective layer 101 over a base substrate 100;

S2, forming a resonant layer 102 over the reflective layer 101;

S3, forming a transflective layer 103 over the resonant layer 102; and

S4, forming a scattering layer 104 over the transflective layer 103.

In the embodiment, the resonant layer 102 between the reflective layer 101 and the transflective layer 103 may constitute a resonant cavity of the light. When the thickness of the resonant cavity is an integral multiple of a half wavelength of a light, the light of the corresponding wavelength may be emitted out.

In this example embodiment, the scattering layer 104 may include a planarization layer 104a and microparticles evenly dispersed in the planarization layer 104a. In the embodiment, the microparticles may be absorbers such as metal microparticles for absorbing lights which are not R, G, B, alternatively, the microparticles may also be scatters for diffusing light, such as organic particles or air microcavities and other medium microparticles.

Based on the above steps S1-S5, a reflective display with a scattering effect may be obtained. In the preparing method of the pixel unit, a scattering layer 104 is added on the basis of the conventional reflective display, in this way, the normal light emitted from the resonant cavity may be scattered or the abnormal light emitted from the resonant cavity may be absorbed, thereby improving the cross color problem when viewed in a side viewing angle, mitigating the color shift phenomenon, so that the display can get a better display effect.

Figure 5:
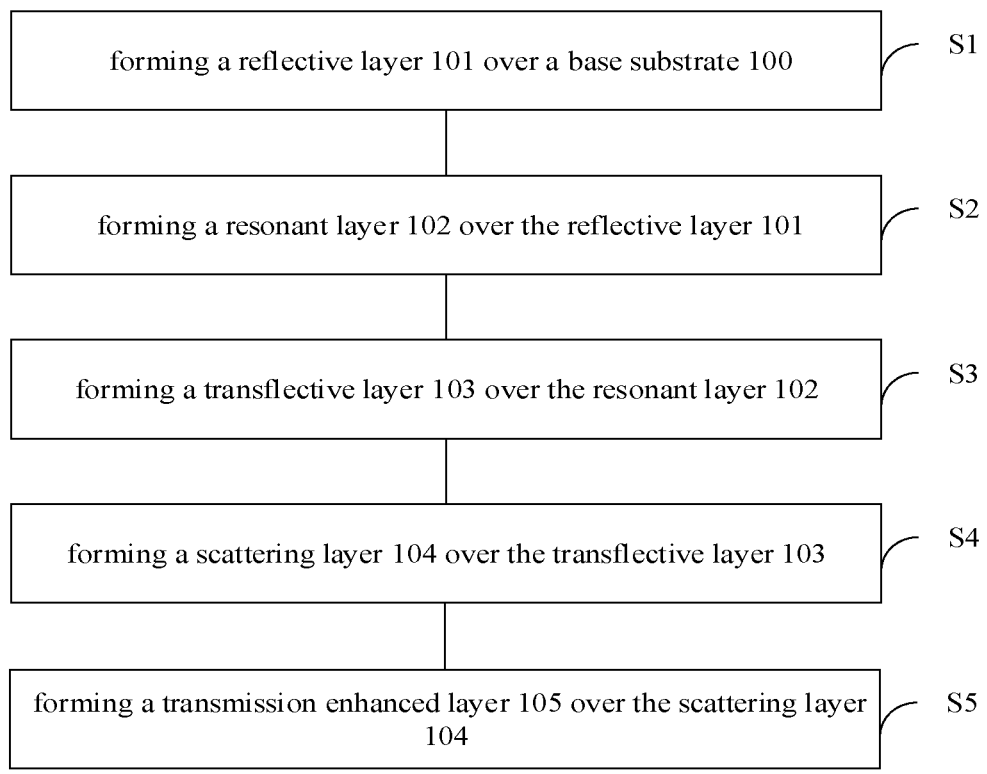
FIG. 5 schematically shows another preparation flow chart of a reflective display according to an exemplary embodiment of the present disclosure.

In view of the contrast ratio of the reflective display, the present example embodiment further provides a method for preparing a pixel unit. As shown in FIG. 5, the preparing method may include:

S1: forming a reflective layer 101 over a base substrate 100;

S2, forming a resonant layer 102 over the reflective layer 101;

S3, forming a transflective layer 103 over the resonant layer 102;

S4, forming a scattering layer 104 over the transflective layer 103; and

S5, forming a transmission enhanced layer 105 over the scattering layer 104.

In the embodiment, the transmission enhanced layer 105 may be a multilayer film structure, or a micro-pillar structure, or include a micro-pillar structure and a multilayer film structure symmetrically disposed on two sides of the micro-pillar structure, which may be used to reduce the reflected light and increase transmitted light, thereby increasing the contrast ratio of the display.

Based on the above steps S1-S5, a reflective display with a transmission enhanced effect may be obtained. Compared with the traditional reflective display, the display can greatly improve the contrast ratio and then obtain a good display effect.

It should be noted that the specific details of the method for preparing the pixel unit have been described in detail in the corresponding structure of the pixel unit, and the details are not described herein again.

The present exemplary embodiment further provides a display panel including the pixel unit described above. The display panel may not only improve the color shift problem when viewed in a side viewing angle, but also improve the contrast ratio of the display.

Still Further, the present exemplary embodiment further provides a display device including the above display panel. The display device may greatly improve the color shift problem when viewed in a side viewing angle and improve the contrast ratio of the display, and therefore has an excellent display effect.

In the embodiment, for example, the display device may include any product or component having a display function, such as a mobile phone, a tablet computer, a television, a notebook computer, a digital photo frame, a navigator, etc., which is not specially limited in the present disclosure.

Through the pixel unit, the display panel and the display device provided by the exemplary embodiment of the present disclosure, a scattering layer is added on the basis of the conventional reflective display, in this way, the normal light emitted from the resonant cavity may be scattered or the abnormal light emitted from the resonant cavity may be absorbed, thereby improving the cross color problem when viewed in a side viewing angle, mitigating the color shift phenomenon, so that the display can get a better display effect.

Other embodiments of the present disclosure will readily occur to those skilled in the art upon consideration of the specification and practice of the invention disclosed herein. The present application is intended to cover any variations, uses, or adaptations of the present disclosure that follow general principles of the present disclosure and include common knowledge or conventional technical means in the art which are not disclosed herein. The specification and embodiments are considered as exemplary only, with the true scope and spirit of the present disclosure being indicated by the appending claims.

It should be understood that the present disclosure is not limited to the precise structures that have been described above and shown in the drawings, and that various modifications and changes may be made without departing from the scope thereof. The scope of the present disclosure is limited only by the accompanying claims.

What is claimed is:

1. A pixel unit, comprising:
   a base substrate;
   a reflective layer, disposed on a side of the base substrate;
   a resonant layer, disposed on a side of the reflective layer away from the base substrate;
   a transflective layer, disposed on a side of the resonant layer away from the base substrate; and
   a scattering layer, disposed on a side of the transflective layer away from the base substrate,
   wherein the scattering layer comprises a planarization layer and microparticles dispersed inside the planarization layer, and
   wherein the microparticle comprises an absorber that absorbs a light with a specific wavelength.

2. The pixel unit according to claim 1, wherein the absorber comprises metal microparticles, and a size of the metal microparticle is in an order of nanometer.

3. The pixel unit according to claim 2, wherein the metal microparticle comprises one or more of gold, silver and copper.

4. The pixel unit according to claim 1, wherein the microparticle comprises a scatterer, and a refractive index of the scatterer is different from that of the planarization layer.

5. The pixel unit according to claim 4, wherein the scatterer comprises organic particles.

6. A display panel, comprising the pixel unit according to claim 1.

7. A display device, comprising the display panel according to claim 6.

8. A pixel unit, comprising:
   a base substrate;
   a reflective layer, disposed on a side of the base substrate;
   a resonant layer, disposed on a side of the reflective layer away from the base substrate;
   a transflective layer, disposed on a side of the resonant layer away from the base substrate; and
   a scattering layer, disposed on a side of the transflective layer away from the base substrate,
   wherein the scattering layer comprises a planarization layer and microparticles dispersed inside the planarization layer, and
   wherein the scatterer comprises an air microcavity.

9. A display panel, comprising the pixel unit according to claim 8.

10. A display device, comprising the display panel according to claim 9.

11. A pixel unit, comprising:
    a base substrate;
    a reflective layer, disposed on a side of the base substrate;
    a resonant layer, disposed on a side of the reflective layer away from the base substrate;
    a transflective layer, disposed on a side of the resonant layer away from the base substrate;
    a scattering layer, disposed on a side of the transflective layer away from the base substrate; and
    a transmission enhanced layer, disposed on a side of the scattering layer away from the base substrate.

12. The pixel unit according to claim 11, wherein the transmission enhanced layer has a micro-pillar structure, and upper and lower surfaces of the transmission enhanced layer have a symmetrical structure.

13. The pixel unit according to claim 11, wherein the transmission enhanced layer has a multilayer film structure.

14. The pixel unit according to claim 11, wherein the transmission enhanced layer comprises a micro-pillar structure and a multilayer film structure symmetrically disposed on two sides of the micro-pillar structure.

15. A display panel, comprising the pixel unit according to claim 11.

16. A display device, comprising the display panel according to claim 15.

* * * * *